United States Patent
Wang et al.

(10) Patent No.: US 9,990,616 B2
(45) Date of Patent: Jun. 5, 2018

(54) MAGNETIC HEAD PROTECTION FRAME, CARD SWIPING MODULE, AND POS MACHINE

(71) Applicant: PAX COMPUTER TECHNOLOGY (SHENZHEN) CO., LTD., Shenzhen (CN)

(72) Inventors: Yuzhuo Wang, Shenzhen (CN); Zhiqiang Huang, Shenzhen (CN)

(73) Assignee: PAX COMPUTER TECHNOLOGY (SHENZHEN) CO., LTD., Shenzhen, Guangdong (CN)

(*) Notice: Subject to any disclaimer, the term of this patent is extended or adjusted under 35 U.S.C. 154(b) by 229 days.

(21) Appl. No.: 15/108,501

(22) PCT Filed: May 28, 2015

(86) PCT No.: PCT/CN2015/080107
§ 371 (c)(1),
(2) Date: Jun. 27, 2016

(87) PCT Pub. No.: WO2016/187880
PCT Pub. Date: Dec. 1, 2016

(65) Prior Publication Data
US 2017/0169410 A1    Jun. 15, 2017

(51) Int. Cl.
*G06K 7/08* (2006.01)
*G06Q 20/20* (2012.01)
*G06Q 20/34* (2012.01)

(52) U.S. Cl.
CPC ............ *G06Q 20/20* (2013.01); *G06K 7/087* (2013.01); *G06Q 20/34* (2013.01)

(58) Field of Classification Search
CPC .......... G06K 7/08; G06K 7/084; G06K 7/087; G06K 7/088

(Continued)

(56) References Cited

U.S. PATENT DOCUMENTS

| 7,878,397 | B2 | 2/2011 | Mirkazemi-Moud et al. |
| 9,286,494 | B1* | 3/2016 | Lamfalusi ............ G06K 7/0004 |

(Continued)

FOREIGN PATENT DOCUMENTS

| CN | 201194161 | 2/2009 |
| CN | 101617325 | 12/2009 |

(Continued)

OTHER PUBLICATIONS

Inernational Search Report for International Application No. PCT/CN2015/080107, dated Mar. 7, 2016, total 12 pages.

*Primary Examiner* — Daniel Hess
(74) *Attorney, Agent, or Firm* — Hamre, Schumann, Mueller & Larson, P.C.

(57) ABSTRACT

The present invention is applicable to the field of POS machines, and provides a magnetic head protection frame used in a POS machine, a card swiping module using the magnetic head protection frame, and a POS machine using the card swiping module. The magnetic head protection frame comprises a support frame, the support frame is strip-shaped, and the support frame defines a first opening exposing the magnetic head; a circuit board is mounted on an outside surface of the support frame, the circuit board is arranged along the whole length direction of the support frame, and the circuit board avoids a position corresponding to the first opening; connecting wires are connected on the circuit board. By arranging the circuit board on the outside surface of the support frame, since the circuit board will be open-circuited or short-circuited when it is subjected to a physical attack, an alarming signal will be triggered, and thus a security processor on a main board of the POS machine can be triggered, such that information stored in electronic components in a protected area is erased or destroyed, the function of preventing user information from (Continued)

being stolen is achieved, and the magnetic head is protected so as to read card information safely.

18 Claims, 5 Drawing Sheets

(58) Field of Classification Search
USPC .......................................................... 235/449
See application file for complete search history.

(56) References Cited

U.S. PATENT DOCUMENTS

2009/0072033 A1* 3/2009 Schulz .................. G06K 7/084
235/449
2013/0140364 A1* 6/2013 McJones ................ G06K 7/082
235/449

FOREIGN PATENT DOCUMENTS

| CN | 201838008 | 5/2011 |
| CN | 102663852 | 9/2012 |
| CN | 204759631 | 11/2015 |

* cited by examiner

MAGNETIC HEAD PROTECTION FRAME, CARD SWIPING MODULE, AND POS MACHINE

FIELD OF THE INVENTION

The present invention relates to the technical field of POS (Point Of Sale) machines, and more particularly to a magnetic head protection frame used in a POS machine, a card swiping module using the magnetic head protection frame, and a POS machine using the card swiping module.

BACKGROUND OF THE INVENTION

Magcard payment is used more and more widely, and POS machines are used more and more. Since a magnetic head of a POS machine needs to read account information of cards, for example, bank cards, credit cards, and the like of users, in order to prevent account information of the users from being stolen, the security protection for the magnetic head of the POS machine is particularly important. When the POS machine swipes a card, a magnetic stripe area of the card needs to pass the magnetic head, such that the magnetic head reads account information in the card; therefore, the magnetic head is usually mounted on a strip-shaped frame, the card is guided through the frame, thus it is ensured that the magnetic head can well read the information in the card, and the magnetic head is connected with a main board of the POS machine through wires. However, when a user uses the POS machine to swipe a card, he/she may not observe carefully, or may not know whether an additional magnetic head has been mounted on the magnetic head frame. As a result, some malicious persons may illegally mount magnetic heads on magnetic head frames to steal user information.

SUMMARY OF THE INVENTION

A purpose of the present invention is to provide a magnetic head protection frame, which is aimed at solve the problem of how to prevent magnetic heads from being illegally mounted on magnetic head frames of POS machines.

The present invention is realized by the following solution: a magnetic head protection frame, which comprises a support frame configured to support a magnetic head and guide a card to pass the magnetic head; the support frame is strip-shaped, the support frame has an outside surface that is adjacent to the card, and the support frame defines a first opening exposing the magnetic head; a circuit board configured to trigger an alarming signal when the support frame is physically attacked is mounted on the outside surface of the support frame; the circuit board is arranged along the whole length direction of the support frame, and the circuit board avoids a position corresponding to the first opening; connecting wires configured to connect a main board of a POS machine are connected on the circuit board.

In the present invention, the outside surface of the support frame is provided with a circuit board; since the circuit board will be open-circuited or short-circuited when it is subjected to a physical attack, the alarming signal will be triggered, and thus a security processor on the main board of the POS machine can be triggered, such that information stored in electronic components in a protected area is erased or destroyed, the function of preventing user information from being stolen is achieved, and the magnetic head is protected so as to read card information safely.

Another purpose of the present invention is to provide a card swiping module, which comprises a magnetic head configured to read information in a card, and further comprises the aforesaid magnetic head protection frame; wherein the magnetic head is mounted on a position corresponding to the first opening of the magnetic head protection frame.

The card swiping module uses the aforesaid magnetic head protection frame, thus it is more secure than card swiping modules in the prior art, and can better prevent the user information from being stolen.

Another purpose of the present invention is to provide a POS machine, which comprises a casing and a main board mounted in the casing, the aforesaid card swiping module is mounted at a side of the casing, and the card swiping module is electrically connected with the main board; the POS machine further comprises a clamping board which cooperates with the card swiping module to clamp the card and thereby guide the card, and a lower side of the clamping board is fixedly connected with the casing.

The POS machine uses the aforesaid card swiping module, and thus can be used more securely and prevent user information from being stolen.

DETAILED DESCRIPTION OF THE PREFERRED EMBODIMENT

In order to make the purposes, technical solutions, and advantages of the present invention be clearer, the present invention will be further described in detail hereafter with reference to the accompanying drawings and embodiments. It should be understood that the embodiments described herein are only intended to illustrate but not to limit the present invention.

In the description of the present invention, it needs to be noted that the positions or position relations indicated by position terms such as "middle", "above", "below" "horizontal", "bottom", "inside", "outside", and the like, are position or position relations based on the arrangement of a device being used, and are only intended to describe the present invention conveniently and simplify the description, but do not express or imply that the indicated devices or components must have particular positions or be structured and operated in particular positions, and therefore should not be considered as limitations to the present invention.

Figure 1:
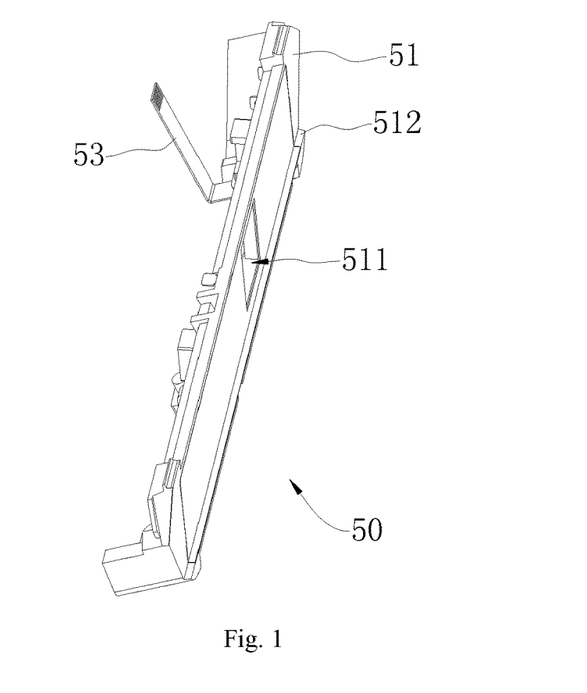
FIG. 1 is a perspective structural schematic view of a magnetic head protection frame provided by an embodiment of the present invention.
Figure 2:
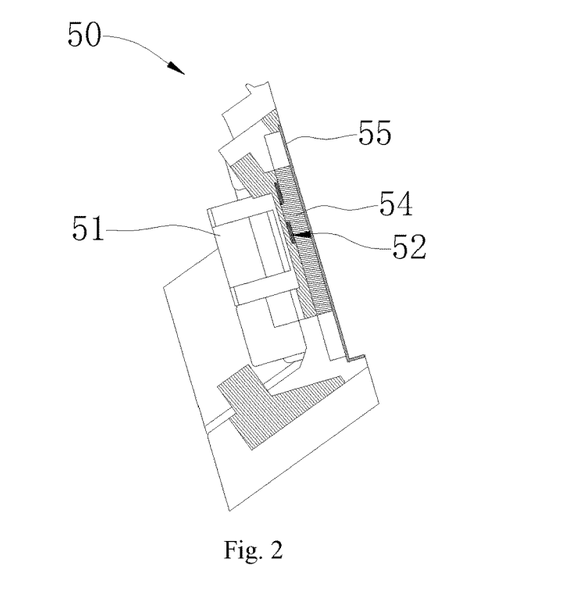
FIG. 2 is a cut-away structural schematic view of the magnetic head protection frame shown in FIG. 1.
Figure 3:
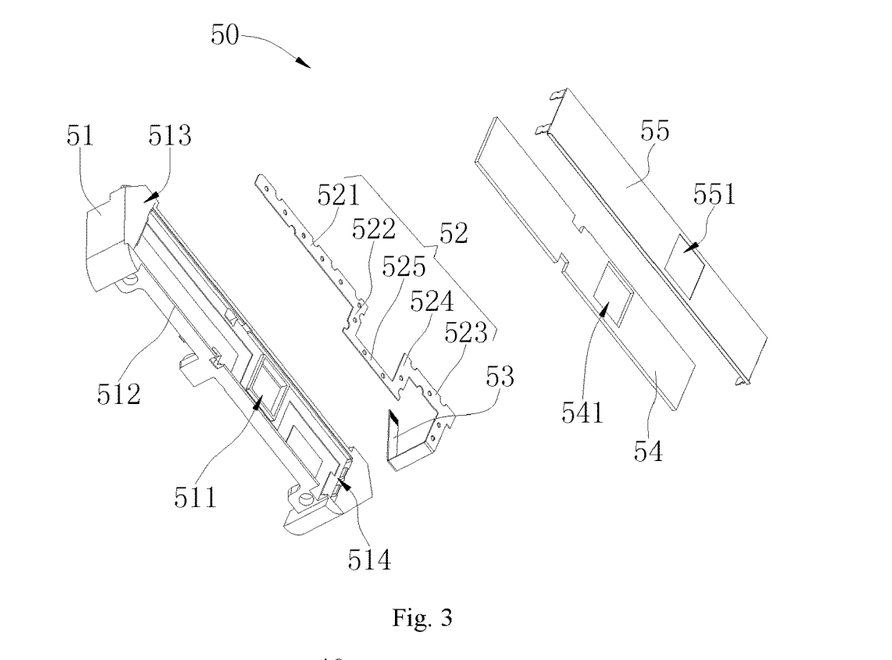
FIG. 3 is a disassembled structural schematic view of the magnetic head protection frame shown in FIG. 1.
Figure 4:
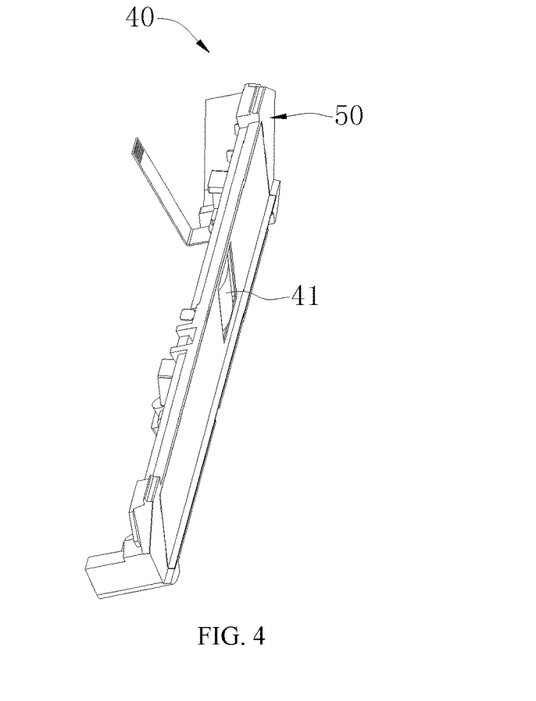
FIG. 4 is a perspective structural schematic view of a card swiping module provided by an embodiment of the present invention.

Please refer to FIG. 1, FIG. 2, and FIG. 3, a magnetic head protection frame 50 provided by an embodiment of the present invention comprises a support frame 51 and a circuit board 52; the support frame 51 is strip-shaped, please also referring to FIG. 4, the support frame 51 is configured to support the magnetic head 41, and when a card is being swiped, the support frame 51 is also configured to guide the card and adjust the angle and the position of the card, so that a magnetic stripe area on the card can be aligned with the magnetic head 41, and thus the magnetic head 41 reads information in the card. The support frame 51 defines a first opening 511 that exposes the magnetic head 41 out, such that the magnetic head 41 can better read the information in the card. The support frame 51 has an outside surface 513 that is adjacent to the card, that is, when the card is being swiped, a surface of the support frame 51 that is adjacent to the card is the outside surface 513 of the support frame 51. The circuit board 52 is arranged along the whole length direction of the support frame 51, and is configured to trigger an alarming signal when the support frame 51 is physically attacked; moreover, the circuit board 52 is mounted on the outside surface 513 of the support frame 51, and the circuit board 52 avoids a position corresponding to the first opening 511. When a magnetic head 41 is illegally mounted on the support frame 51, the support frame 51 will be destroyed. By the arrangement of the circuit board 52, when the support frame 51 is physically attacked, the circuit board 52 will be open-circuited or short-circuited, that is, the alarming signal will be triggered, such that a function of reminding a user is achieved, and a function of preventing a magnetic head 41 from being illegally mounted on the support frame 51 is further achieved.

By arranging the circuit board 52 on the outside surface of the support frame 51, since the circuit board 52 will be open-circuited or short-circuited when it is subjected to a physical attack, such that the function of reminding a user or preventing a magnetic head 41 from being illegally mounted on the support frame 51 is achieved, and thus user information is prevented from being stolen, and the magnetic head is protected so as to read card information safely. By the arrangement of the circuit board 52, when the support frame 51 is subjected to a physical attack, the circuit board 52 will be damaged, and a function of alarming or locking out the magnetic head 41 can also be achieved. Furthermore, the circuit board 52 can also generate interference electromagnetic signals, that is, when the magnetic head 41 is reading the user information in the card, the circuit board 52 generates an electromagnetic signal simultaneously; thus, although an electromagnetic probe is used to detect an electromagnetic signal on the support frame 51, it is impossible to read the magnetic signals generated on the magnetic head 41 and wires thereof accurately, so that the user information is effectively prevented from being stolen, and the magnetic head 41 is protected so as to read the card information safely.

Connecting wires 53 are connected with the circuit board 52, so that the circuit board 52 is electrically connected with a main board of a POS machine via the connecting wires 53. In particular, the circuit board 52 can be connected with a security processor on the main board of the POS machine, when the circuit board 52 is open-circuited or short-circuited and thus triggers an alarming signal, the security processor can be triggered, and thus information stored in electronic components in a protected area is erased or destroyed, such that a function of preventing user information from being stolen is achieved. Furthermore, when the circuit board 52 performs the function of generating the interference electromagnetic signal, the main board of the POS machine is used to the interference electromagnetic signal generated by the circuit board 52, for example, to control the time when the interference electromagnetic signal is generated, to control the frequency, strength, and amplitude of the generation of the interference electromagnetic signal, and so on. When the time of the interference electromagnetic signal generated on the circuit board 52 is synchronous with the reading time of the magnetic head 41, during the time interval when the magnetic head 41 does not read the information in the card, the circuit board 52 will not generate the interference electromagnetic signal, so that the interference electromagnetic signal can be prevented from being detected during the time interval when the magnetic head 41 is not used, and thus the interference electromagnetic signal is prevented from being cracked, and the function of preventing the information in the card from being stolen is performed better.

Furthermore, the circuit board 52 includes a support piece (not labeled in the drawings) and a coil (not shown in the drawings) arranged on the support piece, and the coil is connected with the connecting wires 53. By generating the interference electromagnetic signal using the coil, the coil can be better arranged on the whole circuit board 52, such that the interference electromagnetic signal generated on the circuit board 52 is more uniform, the interference function is better provided, and the cost is low. Furthermore, the coil can be a multilayer coil structure, such that the whole support piece is covered, and thus the interference function is performed better. Additionally, when the alarming capability of the circuit board 52 is used, the multilayer coil covers the whole support frame; when any point extends onto the circuit board 52, the coil on the support piece will be damaged, and thus the alarming function is performed better. The circuit board 52 can be a printed circuit board 52, that is, the coil can be a printed circuit. In other embodiments, electromagnetic generation components can also be arranged on the circuit board 52.

Furthermore, when the magnetic head protection frame 50 is mounted on the casing of the POS machine, the casing encloses a lower portion of the support frame 51, and only an upper portion of the outside surface 513 of the support frame 51 can be inserted or damaged by a detection device and is difficult to be found; therefore, the circuit board 52 needs to cover at least the upper portion of the outside surface 513 of the support frame 51. In this way, an area of the circuit board 52 can also be reduced, so that the cost is reduced. Of course, in other embodiments, the circuit board 52 can also cover the whole outside surface 513 of the support frame 51.

Furthermore, the circuit board 52 includes a first section 521, a second section 522, a third section 523, a fourth section 524, and a fifth section 525. The first section 521 extends from one end of the support frame 51 towards the first opening 511, that is, extends from the end of the support frame 51 to the first opening 511; and the first section 521 is located on the upper portion of the outside surface 513 of the support frame 51. The third section 523 extends from another end of the support frame 51 towards the first opening 511, that is, extends from the another end of the support frame 51 to the first opening 511; and the third section 523 is located on the upper portion of the outside surface 513 of the support frame 51. The second section 522 extends downward from an end of the first section 521 that is adjacent to the first opening 511; and the fourth section 524 extend downward from an end of the third section 523 that is adjacent to the first opening 511. The fifth section 525 is connected with a lower end of the second section 522 and a lower end of the fourth section 524; in this way, the second section 522, the fourth section 524, and the fifth section 525 cooperatively avoid the first opening 511, and thus the circuit board 52 is prevented from covering the magnetic head 41. Moreover, this structural design can use a less circuit board 52 to protect the outside surface 513 of the support frame 51.

Furthermore, the outside surface 513 of the support frame 51 defines a groove 514 configured to receive the circuit board 52 cooperatively. By defining the groove 514 in the outside surface 513 of the support frame 51, the circuit board 52 can be positioned and mounted conveniently, thereby improving the assembling efficiency of the magnetic head protection frame 50. Additionally, when the magnetic head protection frame 50 is stored and assembled, a function of protecting the circuit board 52 can be provided so as to prevent side edges of the circuit board 52 from being worn.

Furthermore, a lower side edge of the outside surface 513 of the support frame 51 protrudes to form a convex strip 512. The arrangement of the convex strip 512 can be used to position the card, such that the magnetic stripe area on the card is better aligned with the magnetic head 41. That is, when the card is positioned on the support frame 51, the card can be positioned on the convex strip 512, and thus the height location of the card is positioned; the card is positioned towards the outside surface 513 of the support frame 51, such that the magnetic stripe area on the card is aligned with the magnetic head 41 mounted on the support frame 51.

Furthermore, the first opening 511 is located on a middle location of the support frame 51. In this way, the magnetic head 41 can be better protected, such that the magnetic head 51 keeps away from the two ends of the support frame, and damaging the magnetic head 41 or detecting the magnetic head 41 from the two ends of the support frame 51 can also be better prevented.

The circuit board 52 can be stuck on the outside surface 513 of the support frame 51. In other embodiments, the circuit board 52 can also be welded on the support frame 51, or fixed on the support frame 51 by screws, or injection molded on the support frame 51 directly.

Furthermore, the magnetic head protection frame further comprises a protection piece 54 covering on the circuit board 52, and a portion of the protection piece 54 corresponding to the first opening 511 defines a second opening 541. By the arrangement of the protection piece 54, the circuit board 52 can be protected by the protection piece 54, and the circuit board 52 is prevented from being worn when the card is swiped. Preferably, the circuit board 52 is mounted between the support frame 51 and the protection piece 54, that is, the support frame 51 and the protection piece 54 enclose the circuit board 52 therebetween and form an integrated body, and only the conductive wires 53 extend out to be connected with the main board of the POS machine.

Furthermore, the magnetic head protection frame 51 further comprises a metal strip 55 covering the outside surface 513 of the support frame 51, the circuit board 52 is located between the support frame 51 and the metal strip 55, and a portion of the metal strip 55 corresponding to the first opening 511 defines a third opening 551. By the arrangement of the metal strip 55, the strength of the support frame 51 can be improved; moreover, by the arrangement of the metal strip 55, a function of physically protecting the support frame 51 can be provided, thereby preventing the support frame 51 from being damaged. Additionally, the metal strip 55 can provide a shielding function, and thus better prevent the electromagnetic signals generated when the magnetic head 41 reads the card from being detected from outside.

Furthermore, when both the protection piece 54 and the metal strip 55 are arranged, the protection piece 54 is located between the circuit board 52 and the metal strip 55, such that the protection piece 54 provides a function of separating the metal strip 55 from the circuit board 52, and prevents the circuit board 52 from being short-circuited. The protection piece 54 can be a plastic piece, and can also be made of other insulating material. The metal strip 55 preferably adopts a stainless steel piece, which has a high strength, and will not wear the card due to rust.

Figure 5:
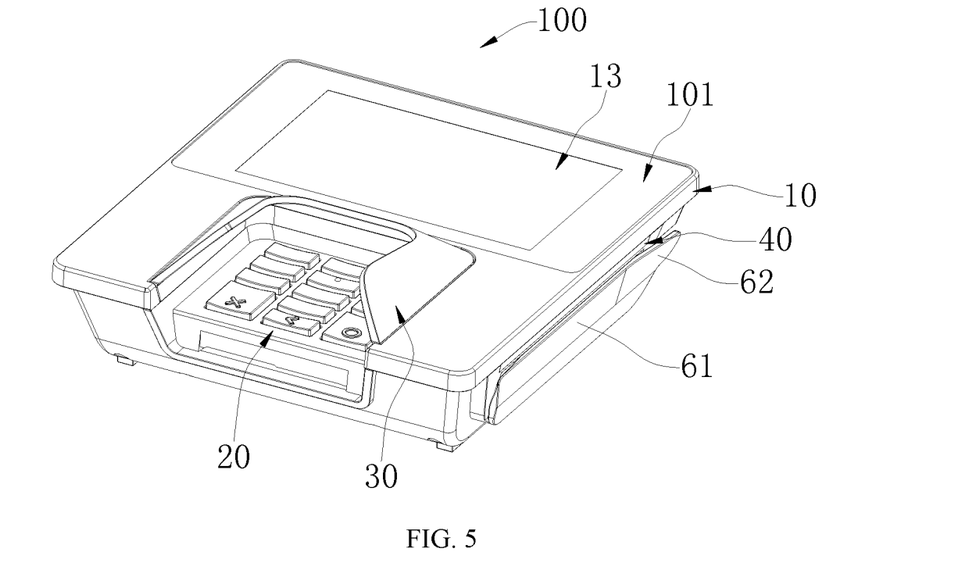
FIG. 5 is a perspective structural schematic view of a POS machine provided by an embodiment of the present invention.

Please refer to FIG. 5, an embodiment of the present invention further provide a card swiping module 40. Please also refer to FIG. 1, the card swiping module 40 includes a magnetic head 41 configured to read information in a card and the aforesaid magnetic head protection frame 50, and the magnetic head 41 is mounted at a location corresponding to the first opening 511 of the magnetic head protection frame 50. The card swiping module 40 uses the aforesaid magnetic head protection frame 50, thus it is more secure than a card swiping module 40 in the prior art, and can better prevent user information from being stolen. Additionally, when the circuit board 52 of the magnetic head protection frame 50 is damaged, an alarming function can also be provided.

Please refer to FIG. 3, FIG. 4, and FIG. 5, an embodiment of the present invention further provides a POS machine 100, which comprises a casing 10, a main board (not shown in the drawings) mounted inside the casing 10, and a clamping board 61 arranged at a side of the casing 10; the aforesaid card swiping module 40 is mounted at one side of the casing 10, a lower side of the clamping board 61 is fixedly connected with the casing 10, the clamping board 61 and the card swiping module 40 are located at the same side of the casing 10, and the clamping board 61 is located at a relative outside of the card swiping module 40; the clamping board 61 and the card swiping module 40 are arranged spacedly, and the clamping board 61 and the card swiping module 40 are used to cooperatively clamp a card, and thus guide the card to adjust an angle thereof, such that a magnetic stripe on the card is aligned with the magnetic head 41 of the card swiping module 40. The main board is usually provided thereon with a security processor, and the connecting wires 53 of the circuit board 52 in the magnetic head protection frame 50 of the card swiping module 40 is connected with the main board.

The POS machine 100 uses the aforesaid card swiping module 40, and thus it is more secure than a POS machine 100 in the prior art, and can better prevent user information from being stolen.

Figure 6:
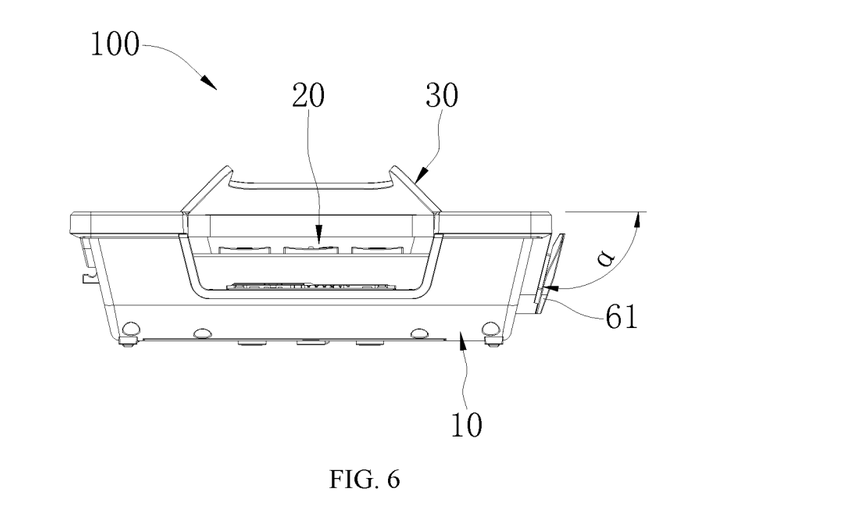
FIG. 6 is a frontal structural schematic view of the POS machine shown in FIG. 5.

Please also refer to FIG. 3 and FIG. 6, preferably, the clamping board 61 is arranged to be parallel to the outside surface 513 of the support frame 51 of the magnetic head protection frame 50 of the card swiping module 40. By arranging the clamping board 61 to be parallel to the outside surface 513 of the support frame 51, it is convenient that the position and the angle of the card are better adjusted when the card is swiped.

Furthermore, the clamping board 61 is arranged obliquely with respect to an upper surface 101 of the casing 10, and an inclined angle α of the clamping board 61 with respect to the upper surface 101 of the casing 10 ranges from 100 to 120 degrees. When swiping a card, the POS machine 100 is usually placed on a horizontal table, and meanwhile a clamping board 61 of a conventional POS machine 100 is usually positioned vertically; when the card is inserted between the card swiping module 40 and the clamping board 61, the card needs to be positioned vertically; however, when a person positions the card normally, the card may appear a certain angle with respect to a vertical direction, which may result in that the angle of the card needs to be passively adjusted when the card is inserted between the card swiping module 40 and the clamping board 61, and thus the card may be worn. On the contrary, if the range of the inclined angle α of the clamping board 61 with respect to the upper surface 101 of the casing 10 is set to be 100-120 degrees, the amount by which the angle of the card needs to be passively adjusted can be reduced, so that the abrasion of the card can be reduced and a user can feel more comfortable when swiping the card.

Figure 9:
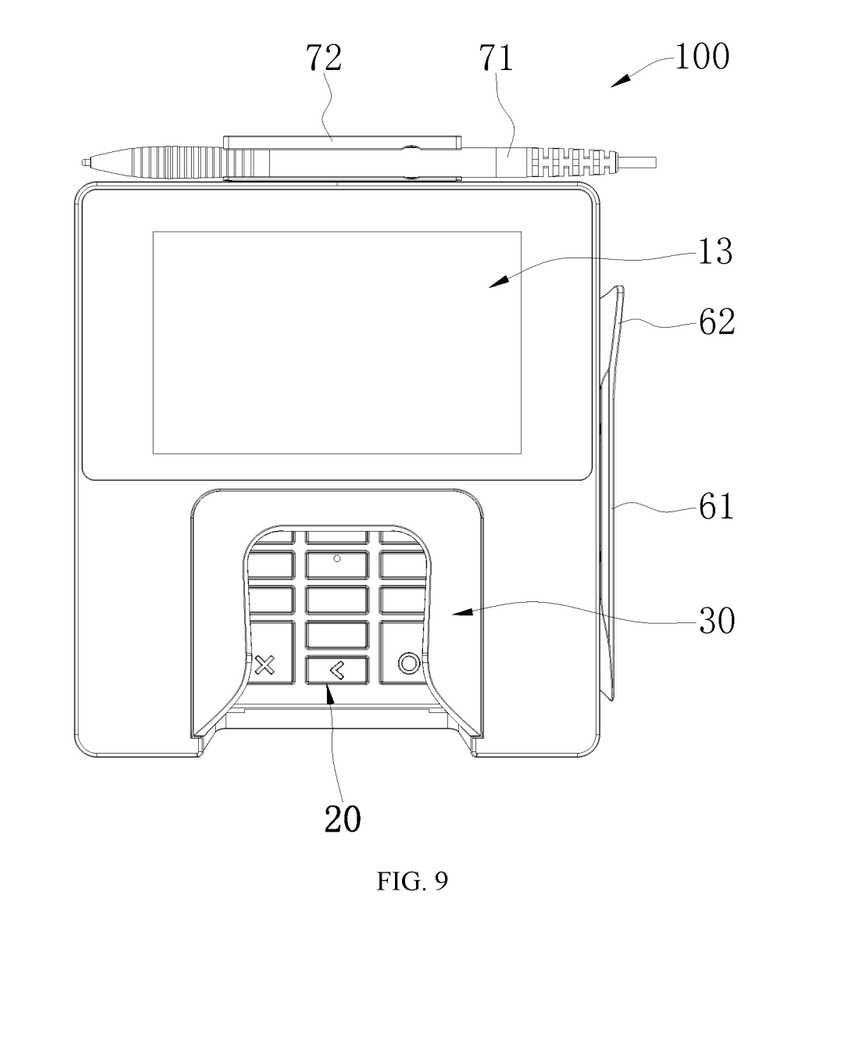
FIG. 9 is a perspective structural schematic view of mounting an electromagnetic pen at another side of the POS machine shown in FIG. 5.

Please refer to FIG. 4, FIG. 5 and FIG. 9, furthermore, one end of the clamping board 61 is provided with a guiding board 62 opening towards a direction that is away from the casing 10. Since the clamping board 61 and the card swiping module 40 need to cooperatively clamp the card so as to guide and adjust the angle of the card, a distance between the clamping board 61 and the card swiping module 40 is small, and a good alignment is required when swiping the card. By the arrangement of the guiding board 62, the card can be guided between the clamping board 61 and the card swiping module 40 more conveniently, thereby facilitating swiping cards and improving the comfort level of swiping cards.

Furthermore, in this embodiment, the casing 10 is further provided thereon with a keyboard 20 configured to input user information, and the keyboard 20 is electrically connected with the main board. By the arrangement of the keyboard 20, users can input information such as passwords conveniently, and thus the application range of the POS machine 100 is improved. Of course, in other embodiments, the POS machine 100 can also be connected with an external input device, such as a keyboard 20. In further other embodiments, the POS machine 100 can be directly connected with a computer main board, and information is input through a computer keyboard 20.

Furthermore, a peep-proof cover 30 configured to cover at least three side edges of the keyboard 20 is mounted on the casing 10. By the arrangement of the peep-proof cover 30, when a user inputs information such as a password, the side edges of the keyboard 20 can be covered, peep is prevented, and thus user information is better prevented from being stolen.

Figure 7:
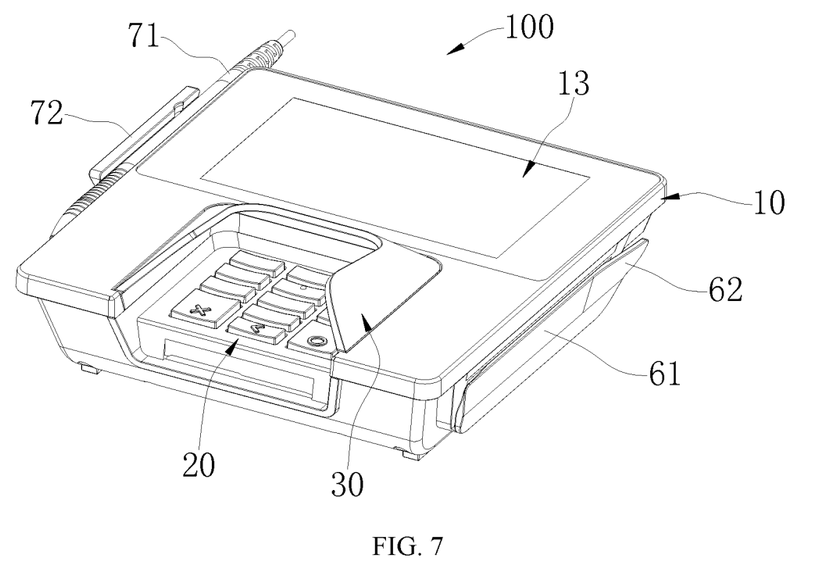
FIG. 7 is a perspective structural schematic view of mounting an electromagnetic pen at one side of the POS machine shown in FIG. 5.
Figure 8:
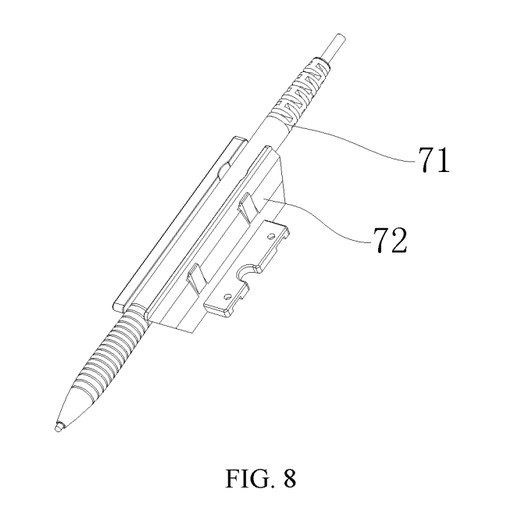
FIG. 8 is an enlarged structural schematic view of the electromagnetic pen and a pen holder shown in FIG. 7.

Please refer to FIG. 7, FIG. 8, and FIG. 9, furthermore, in order to help users view in use, the casing 10 is further provided thereon with a display screen 13, and the display screen 13 is electrically connected with the main board. By the arrangement of the display screen 13, information, such as consumption, can be displayed, which is more intuitive and convenient. Additionally, the display screen 13 can be a touch screen, so that users can operate and use more conveniently.

In this embodiment, the display screen 13 is an electromagnetic display screen. The POS machine 100 further includes an electromagnetic pen 71 configured to input information on the electromagnetic display screen. By the use of the electromagnetic display screen and the electromagnetic pen 71, users can sign more conveniently, so that electronic operation is improved and use of paper is reduced, which is more environmentally friendly and more convenient.

Furthermore, a penholder 72 configured to clamp the electromagnetic pen 71 is mounted at a side of the casing 10. By the arrangement of the penholder 72, the electromagnetic pen 71 can be positioned conveniently. In this embodiment, the penholder 72 is fixed on the casing 10 by screws, and the casing 10 defines screw holes correspondingly. Please refer to FIG. 7, the penholder 72 can be mounted on a left side of the POS machine 100. The clamping board 61 and the penholder 72 are respectively located at two opposite sides of the casing 10. In other embodiments, please refer to FIG. 9, the penholder 72 can be mounted at a rear side of the POS machine 100, such that the mounting location of the penholder 72 can be determined according to various locations for positioning the POS machine 100, and users can use conveniently.

The above are only preferred embodiments of the present invention and are not intended to limit the present invention. Any modification, equivalent replacement, and improvement made within the spirit and principle of the present invention should be included in the protection scope of the present invention.

What is claimed is:

1. A magnetic head protection frame, which comprises a support frame configured to support a magnetic head and guide a card to pass the magnetic head; the support frame being strip-shaped, the support frame having an outside surface that is adjacent to the card, and the support frame defining a first opening exposing the magnetic head; wherein, a circuit board configured to trigger an alarming signal when the support frame is physically attacked is mounted on the outside surface of the support frame; the circuit board is arranged along the whole length direction of the support frame, and the circuit board avoids a position corresponding to the first opening; connecting wires configured to connect a main board of a POS machine are connected on the circuit board.

2. The magnetic head protection frame according to claim 1, wherein, the circuit board covers at least an upper portion of the outside surface of the support frame.

3. The magnetic head protection frame according to claim 1, wherein, the circuit board includes a first section extending from one end of the support frame to the first opening, a second section extending downward from one end of the first section that is adjacent to the first opening, a third section extending from another end of the support frame to the first opening, a fourth section extending downward from one end of the third section that is adjacent to the first opening, and a fifth section connected with a lower end of the second section and a lower end of the fourth section; the first section and the third section are located at the upper portion of the outside surface of the support frame.

4. The magnetic head protection frame according to claim 1, wherein, the outside surface of the support frame defines a groove configured to cooperatively receive the circuit board.

5. The magnetic head protection frame according to claim 1, wherein, a lower side edge of the outside surface of the support frame protrudes to form a convex strip configured to support the card.

6. The magnetic head protection frame according to claim 1, wherein, the first opening is located at a middle portion of the support frame.

7. The magnetic head protection frame according to claim 1, wherein, the magnetic head protection frame further comprises a protection piece covering on the circuit board, and a portion of the protection piece corresponding to the first opening defines a second opening.

8. The magnetic head protection frame according to claim 1, wherein, the magnetic head protection frame further comprises a metal strip covering the outside surface of the support frame, the circuit board is located between the support frame and the metal strip, and a portion of the metal strip corresponding to the first opening defines a third opening.

9. A card swiping module, comprising a magnetic head configured to read information in a card; wherein, the card swiping module further comprises a magnetic head protection frame according to claim 1, and the magnetic head is mounted at a location corresponding to the first opening of the magnetic head protection frame.

10. A POS machine, comprising a casing and a main board mounted inside the casing; wherein, a card swiping module according to claim 9 is mounted at a side of the casing, the card swiping module is electrically connected with the main board, the POS machine further comprises a clamping board configured to cooperate with the card swiping module to clamp the card and thereby guide the card, and a lower side of the clamping board is fixedly connected with the casing.

11. The POS machine according to claim 10, wherein, the clamping board is arranged to be parallel to the outside surface of the support frame of the magnetic head protection frame of the card swiping module.

12. The POS machine according to claim 11, wherein, the clamping board is arranged obliquely with respect to an upper surface of the casing, and an inclined angle of the clamping board with respect to the upper surface of the casing ranges from 100 to 120 degrees.

13. The POS machine according to claim 10, wherein, one end of the clamping board is provided with a guiding board opening towards a direction that is away from the casing.

14. The POS machine according to claim 10, wherein, the casing is further provided with a keyboard configured to input user information, and the keyboard is electrically connected with the main board.

15. The POS machine according to claim 14, wherein, a peep-proof cover configured to cover at least three side edges of the keyboard is mounted on the casing.

16. The POS machine according to claim 10, wherein, the casing is further provided with a display screen, and the display screen is electrically connected with the main board.

17. The POS machine according to claim 16, wherein, the POS machine further comprises an electromagnetic pen configured to input information on the electromagnetic display screen, and the display screen is an electromagnetic display screen.

18. The POS machine according to claim 17, wherein, a penholder configured to clamp the electromagnetic pen is mounted at a side of the casing.

* * * * *